Feb. 28, 1961 W. J. ROOB 2,972,931
VIGNETTING APPARATUS
Filed July 18, 1957 2 Sheets-Sheet 1

INVENTOR.
WALTER J. ROOB
BY
Attorney

Feb. 28, 1961 W. J. ROOB 2,972,931
VIGNETTING APPARATUS
Filed July 18, 1957 2 Sheets-Sheet 2
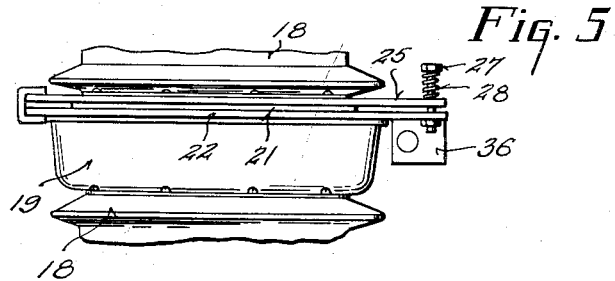
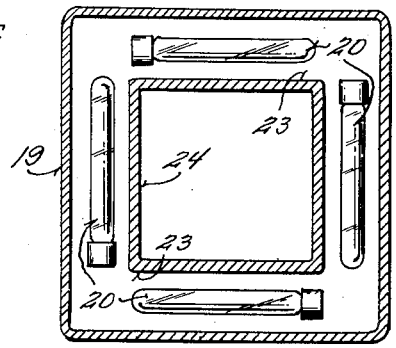
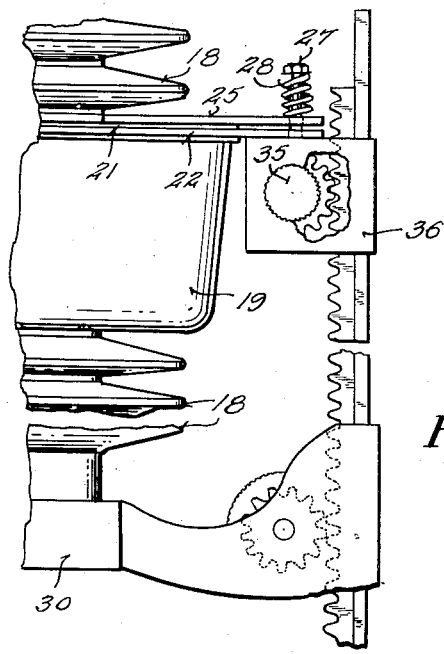
INVENTOR.
WALTER J. ROOB
BY
Attorney United States Patent Office 2,972,931
Patented Feb. 28, 1961

2,972,931
VIGNETTING APPARATUS
Walter J. Roob, 2463 N. Grant Blvd., Milwaukee 10, Wis.
Filed July 18, 1957, Ser. No. 672,727
3 Claims. (Cl. 88—24)

This invention relates to vignetting and more particularly to a new and improved apparatus adapted for use in conjunction with photographic enlargers in projection printing from photographic negatives.

While the process of vignetting, that of gradually fading the principal subject matter of a photograph into the background of desired shading, is virtually as old as photography itself, it has heretofore been accomplished by the manual manipulation of a screen or similar device to accomplish the desired results. In professional photography where a large number of identically vignetted photographic prints are desired, the manually manipulated process of vignetting has made it virtually impossible to maintain the desired or required uniformity of results in all of the finished photographic prints.

The primary object of the present invention resides in the provision, in a photographic enlarger, of a vignetting apparatus by which the desired results may be effected automatically.

Another object resides in the provision in a photographic enlarging apparatus of a vignette adapted for adjustable positioning between the negative and the lens for controlling the size and shape of the printed portion of the photographic negative.

Another object of the invention resides in the provision of an auxiliary light source positioned between the vignette and the lens and operative to control the degree of shading of the marginal portion of the print surrounding that portion of the negative which is printed as the result of the positioning of the vignette.

Another object of the invention resides in the provision of an apertured vignette having a lower surface operative to project light rays from the auxiliary light source through the lens on to the sensitized photographic paper on which the print is to be made to control the shading of the marginal area of the print which surrounds the image projetced on to the paper through the apertured vignette.

A more specific object of the present invention resides in the provision of means for facilitating the removal and replacement of one apertured vignette with another to permit the use of vignettes provided with different sized and shaped apertures.

Another specific object of the invention resides in the provision of means operative to control the intensity of the auxiliary illumination should the same be desirable.

Other objects and advantages of the present vignetting apparatus will become apparent from the following description of an illustrative embodiment of the present invention.

In the drawings:

Fig. 5 is a side elevational view of the vignette holder and associated body adapted to house the auxiliary light source of the apparatus.

Fig. 6 is a horizontal sectional view, taken substantially on the line 6—6 of Fig. 5, showing the positioning of the auxiliary light source utilized to control the shading of the marginal portion of the photographic prints; and Fig. 7 is a fragmentary side elevational view of a portion of the enlarger showing means for adjusting the relative positions of the vignette and lens with respect to the photographic negative from which prints are to be made.

Before entering into a detailed description of the embodiment of the present invention, chosen for illustrative purposes in the accompanying drawings, it is believed that a short description of the vignetting process, as formerly practiced, will serve to emphasize the advantages and improved results obtainable by the use of the present invention.

In the past where vignetting has ben found desirable in enlargement or projection printing from photographic negatives, it has frequently been accomplished by the manual manipulation of a screen or similar object between the lens of the enlarger and the sensitized surface of the photographic paper on which the print is made. With this method of vignetting, the position of the vignette, the pattern of its movement and the duration of the manipulation serve cooperatively to control the end result. In other instances where a darker area is desired surrounding the portion of the image projected through the apertured vignette, the negative may be removed and the marginal area of the print flooded with raw light while the portion of the print on which the image has been projected is protected by means of a screen or similar device. With these commonly practiced methods of vignetting it was frequently found necessary to reprint the picture several times before satisfactory results could be obtained. Furthermore, where a large number of substantially identical prints are required, the manual processes of vignetting, previously described, made it virtually impossible to obtain the desired uniformity of vignetting on each of the prints.

In portrait photography, it often becomes desirable to focus attention of the viewer on a particular portion of the subject to the exclusion of other portions of the subject. This end is often accomplished by the process of vignetting. Where a large number of duplicate prints are required, the manual vignetting operation has fallen far short of providing the desired or required uniformity of background or border shading of the prints.

The apparatus of the present invention provides a simple and effective means whereby any desired degree of shading may be maintained with an unerring degree of uniformity.

Figure 1:
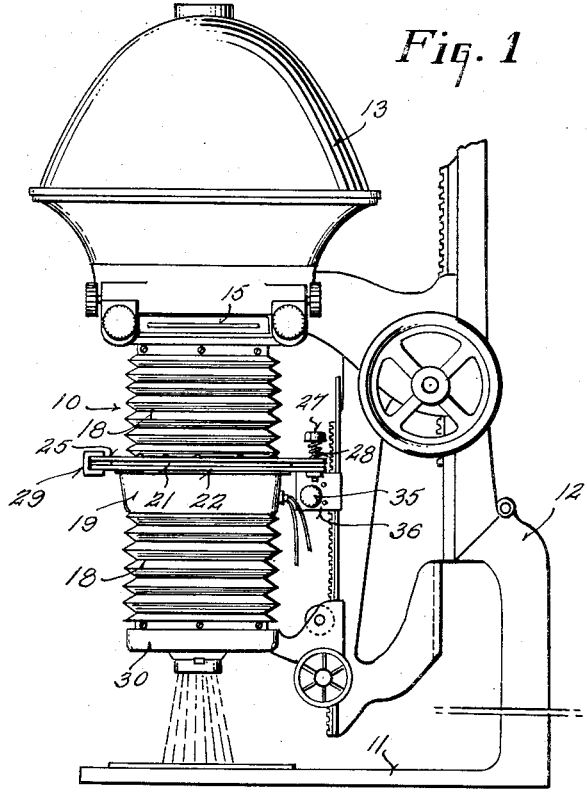
Figure 1 is a side elevational view of a photographic enlarger with a vignetting apparatus constructed in accordance with the teachings of the present invention.
Figure 3:
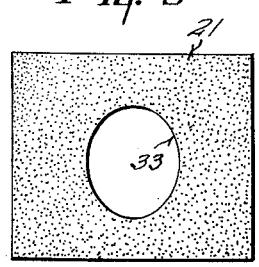
Fig. 3 is the top plan view of the apertured vignette.
Figure 2:
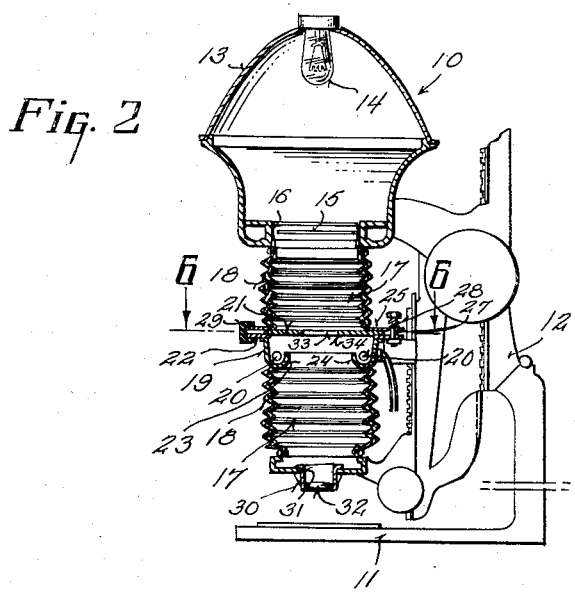
Figure 2 is a vertical sectional view through the apparatus of Fig. 1 showing the relative positioning of the several parts of the enlarger together with that of the vignetting apparatus of the present invention.
Figure 4:
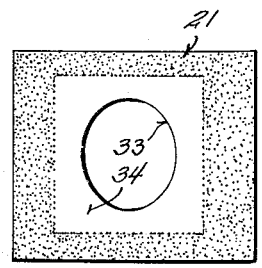
Fig. 4 is the bottom plan view of the vignette shown in Fig. 3 illustrating the reflecting property of the under surface of the vignette which is operative to deflect light rays from the auxiliary source of light onto the sensitized surface of photographic paper.

Referring more particularly to Fig. 1 of the accompanying drawings, it will be noted that the apparatus of the present invention has been embodied in a standard photographic enlarger 10 which normally includes a base or bed 11 on which the sensitized photographic paper may be positioned in any approved or well known manner. A mast or enlarger supporting frame 12 projects from the base 11 to form a support on which the enlarger 10 is adjustably mounted. An enlarger 10 comprises generally a lamp containing a light source in a form of a suitable lamp bulb 14. The lower portion of the lamp house 13 is provided with diametrically opposed slots or openings and a guideway for the slidable receipt of a frame 15, in or upon which a photographic negative is positioned. The lamp house 13 is provided with a bottom opening 16 to permit the transmission of light through the negative and into a chamber 17 formed by a bellows 18 which surrounds the opening 16 and is secured to the bottom of the lamp house 13 in any approved manner. For the purpose of ease of manufacture the bellows 18 is preferably of square or rectangular form.

The bellows is formed of two parts joined by a hollow housing 19 which forms the support for an auxiliary light source, in the form of a plurality of light bulbs 20 and a support for a vignette 21, to be hereinafter more specifically described. The hollow housing 19 is preferably slightly larger than the cross-sectional area of the bellows 18 and includes an outwardly extending marginal flange portion 22 and an inwardly and upwardly directed lower flange 23 which surrounds a central bottom opening 24. The inwardly and upwardly directed flange portion 23 of the housing 19 serves to provide a recess for receiving the plurality of light bulbs 20 which provide the auxiliary illumination to control the shading of the vignetted portion of the print. It should be noted at this point that the inwardly and upwardly directed flange 23 of the housing 19 precludes the direct passage of light rays toward the lens 32 and directs them toward the light-reflecting under surface 34 of the vignette 21. A rectangular frame member 25 having a central opening 26 is disposed to over-lie the marginal flange portion 22 of the housing 19. The lower marginal edge of the upper portion of the bellows 18 is secured to the frame member 25 in any approved manner. The frame member 25 is adjustably secured to the housing 19 in a manner which permits the yieldable separation of the frame member 25 and the housing 19 to permit the insertion or removal of any selected vignette 21.

The mounting means for maintaining the frame in yieldable contact with the housing 19 comprises a plurality of bolts 27 threadedly anchored in one side of the marginal flange portion 22 of the housing 19 and projecting upwardly through suitable holes formed at one side of the frame member 25. A compression spring 28 disposed between the heads of the bolts 27 and the upper surface of the frame member 25 serves to normally maintain the two parts of the housing 19 in yieldable pressure contact with each other. The marginal portion 22 of the housing 19 and frame 25 disposed opposite the bolts 27 may be retained in pressure contact by the application of any suitable clamping means in the form of a yieldable clip 29. When it is desired to position or replace the vignette 21 between the housing 19 and the frame member 25, the clip 29 may be removed and the vignette 21 may be withdrawn from or positioned between the yieldably retained housing 19 and frame 25. The upper marginal edge of the lower portion of the bellows 18 is secured to the lower flange portion 23 of the housing 19 in any approved manner.

A lens carrier frame 30 is secured to the lower marginal edge of the bellows 18. The lens carrier frame 30 is provided with a central opening 31 adapted to position and releasably retain the lens 32.

The vignette 21 comprises a sheet of opaque material such as metal or cardboard of a size substantially equal to that of the frame member 25. A central aperture 33 is formed in the vignette 21. The aperture 33 may be of any desired size and shape in accordance with the requirements of the finished photographic print. The lower surface of the vignette 21 includes a light reflecting area 34 which surrounds the aperture 33. The extent of this light reflecting area 34 may include the entire under surface of the vignette 21 or it may encompass any adequate portion thereof.

As previously mentioned, the apparatus of the present invention is applied to any standard photographic enlarger. In the present instance, it will be observed that the enlarger is of the vertical type provided with the usual means for adjusting the distance between the enlarger itself and the surface of the bed on which the sensitized paper is positioned. It should also be noted that the position of the lens 32 may be adjusted in the usual manner to accomplish the proper focusing of the enlarger with respect to the positioned photographic paper. Referring more particularly to Fig. 1, it will be noted that means is provided for adjusting the position of the vignette holder and housing 19 with respect to the positioned negative disposed adjacent the bottom opening of the lamp house 13. The adjusting means for raising or lowering the housing 19 with respect to the lamp house 13 comprises a pinion (not shown) in cooperating relationship with the rack which is also utilized to adjust the position of the lens carrier 30. A knob 35 fixedly secured to the pinion shaft may be rotated to raise and lower the position of the housing 19 with respect to the photographic negative from which prints are to be made. The actuating mechanism for raising or lowering the housing 19 is carried by a mounting bracket 36 which is attached to the outwardly extending marginal flange 22 of the housing 19.

While the essential elements of the device have been described in the foregoing specifications, it is believed that a brief description of the operation of the device will serve to emphasize both its simplicity and effectiveness in accomplishing the desired results.

Any suitably sized photographic negative is properly positioned, in the usual manner, on the frame 15 which is removably positioned near the bottom of the lamp house 13. A vignette 21 having the proper sized and shaped aperture 33 is selected and positioned between the frame member 25 and the marginal flange portion 22 of the housing 19. The position of vignette 21 is then properly adjusted horizontally within the holder and the holder is adjusted vertically with respect to the negative to a position in which the projected image on the surface of the bed 11 is of the desired size. In order to properly position the vignette 21, it is desirable that the lens 32 and its carrier 30 be adjusted vertically to obtain the correct focusing with respect to the negative and the surface of the base 11. After the proper adjustments have been made, a sheet of sensitized photographic paper is positioned in the usual manner on the bed 11 directly beneath the lens 32. The incandescent lamp 14 and the auxiliary light source 20 are then turned on. Light from the lamp 14 is transmitted through the negative, the aperture 33 in the vignette 21 and the lens 32 to project the subject matter of the negative onto the sensitized photographic paper. Light from the auxiliary source 20 is reflected from the surface 34 of the vignette 21 through the lens 32 and onto the sensitized photographic paper. The projected light rays from the incandescent lamp bulb 14 are of sufficient strength to clearly and sharply delineate the projected portion of the photographic negative on the sensitized photographic paper while the reflected rays from the auxiliary light source 20 serve to expose the area of the sensitized photographic paper beyond the confines of the rays of light projected through the aperture 33 of the vignette 21 to effect the desired exposure of the remaining portion of the photographic paper to obtain the proper background or border shading.

The time of exposure of the sensitized photographic paper to the light from the lamp 14 and auxiliary light source 20 is established in the usual manner. The shading or intensity of the background or marginal portion of the print may be varied in accordance with the intensity of the auxiliary illumination 20 which is controlled, in the usual manner, by an adjustable rheostat. The brighter the illumination of the auxiliary light 20 the darker will be background on the print and the dimmer the illumination of the auxiliary light 20 will result in a lighter background on the resulting print.

In actual practice, it has been found that the sharpest outline of the desired portion of the negative is obtained when the vignette 21 is moved toward the negative and a more diffused outline of the desired portion of the negative is obtained by moving the vignette 21 toward the lens 32.

As previously stated, the size and shape of the aperture 33 in the vignette 21 may be varied and in some instances the so-called aperture may comprise a cut-away portion of one marginal edge of the vignette. The desired vignette may be chosen from a series of vignettes having different size and shaped apertures or cut-away portions best suited for the work at hand.

From the foregoing description of an illustrative embodiment of the present invention, it will be noted that a simple and effective vignetting apparatus has been provided for application to a standard photographic enlarger to insure uniform vignetting results for all prints from any given negative.

While the invention has been described in considerable detail in the foregoing specification, it is to be understand that various changes may be made in its embodiment without departing from or sacrificing any of the advantages hereinafter claimed.

I claim:

1. A vignetting apparatus for use in conjunction with a photographic enlarger which photographic enlarger is characterized by having a lamp house enclosing a primary light source, a negative holder slidably receivable in said lamp house adjacent a light transmitting opening formed therein, a bellows surrounding the light transmitting opening in the lamp house, a lens mounted in the free end of the bellows, a support for a sheet of sensitized photographic paper, adjusting means for altering the position of the lamp house with respect to the sensitized photographic paper support and the lens with respect to the negative holder whereby the image projected from a negative in the holder is properly focused on a sheet of sensitized photographic paper, of a vignetting apparatus mounted in said bellows intermediate its ends, said vignetting apparatus comprising a vignette holder composed of apertured upper and lower plates, resilient means for releasably retaining said plates in associated relationship, and an auxiliary light source fixedly attached to and disposed below said lower apertured plate, said vignette holder and said auxiliary light source being disposed in the bellows, adjusting means for altering the position of said vignette holder with respect to a photographic negative positioned in the negative holder, an apertured vignette positioned in said vignette holder, the adjusted position of said apertured vignette serving to control the size and shape of the image projected from the negative onto the said sensitized photographic paper through the aperture of said vignette, the position of said auxiliary light source being more remote from the photographic negative than that of said apertured vignette, the light from said primary light source passing through the aperture of said vignette serving to control the intensity of the image projected onto the sheet of sensitized photographic paper, and the light projected from said auxiliary light source providing illumination for the side of the vignette disposed opposite the primary light source to thereby reflect and project light rays to control the intensity of light on marginal area of the sensitized photographic paper surrounding that area delineated by the image projected through said apertured vignette.

2. A vignetting apparatus for incorporation into a photographic enlarger which photographic enlarger is characterized by having a light source, a removable negative holder, a bellows, a lens, and a support for a sheet of sensitized photographic paper, said vignetting apparatus comprising a vignette holder disposed transversely of and positioned between the ends of the bellows, said vignette holder comprising a pair of apertured plates, yieldable means for retaining said plates in associated relationship, an opaque vignette having a cut-away portion insertively positionable between said apertured plates in said holder, an auxiliary light source disposed with said bellows, said auxiliary light source being fixedly attached to said lower plate at a position more remote from said negative holder than that of said upper plate; and said vignette holder, and adjusting means operable to alter the relative position between said vignette holder and the negative holder to regulate the size of the image projected onto the sheet of sensitized photographic paper through the cut-away portion of said vignette, the light from the enlarger light source passing through the negative and the cut-away portion of said vignette to control the intensity of the image on a sheet of sensitized photographic paper, and the light projected from said auxiliary light source providing illumination for the under side of said vignette to thereby reflect and project light rays to control the shading of the area of the sensitized photographic paper surrounding that area delineated by the image projected through the cut-away portion of said vignette.

3. A vignetting apparatus for incorporation between the ends of the bellows of a photographic enlarger which photographic enlarger is characterized by having a primary light source, a housing enclosing said light source, a removable negative holder positioned in the housing, a bellows attached to the housing and surrounding the passage within which said removable negative holder is positioned, a lens disposed at the free end of said bellows, a support for a sheet of sensitized paper, and adjusting means for altering the position of the enlarger lens to properly focus the image projected from the negative onto sensitized photographic sheet of paper, said vignetting apparatus comprising a hollow housing disposed transversely of and positioned between the ends of the bellows, said hollow housing including vignette holder and an auxiliary light source, an opaque apertured vignette removably positionable in said hollow housing between said auxiliary light source and said negative holder, an adjusting means for altering the position of said apertured vignette with respect to the photographic negative to thereby control the size of the image projeced through he aperture of said vignette by means of light rays emanating from said primary light source, said auxiliary light source providing illumination for the side of said vignette disposed opposite the primary light source to thereby reflect and project light rays over the area of the sensitized photographic paper surrounding that area of the print delineated by the portion of the photographic negative projected through the aperture of said opaque vignette to thereby control the shading of the marginal area of the photographic print.

References Cited in the file of this patent
UNITED STATES PATENTS

| | | |
|---|---|---|
| 1,313,815 | Hansen | Aug. 19, 1919 |
| 1,606,955 | Montigny | Nov. 16, 1926 |
| 1,748,523 | Smith | Feb. 25, 1930 |
| 2,019,498 | Krug | Nov. 5, 1935 |
| 2,254,125 | Tarullo | Aug. 26, 1941 |
| 2,255,319 | Kanter | Sept. 9, 1941 |
| 2,326,542 | Leonard | Aug. 10, 1943 |
| 2,455,142 | Simmon et al. | Nov. 30, 1948 |
| 2,663,232 | Drillick | Dec. 22, 1953 |
| 2,804,002 | Simpson | Aug. 27, 1957 |

FOREIGN PATENTS

| | | |
|---|---|---|
| 150,912 | Great Britain | Sept. 16, 1920 |
| 605,609 | France | May 29, 1926 |